United States Patent
Mastrocola et al.

(10) Patent No.: US 10,526,971 B2
(45) Date of Patent: Jan. 7, 2020

(54) SUPER-COOLED HEAT EXCHANGER OF AN AIR CYCLE MACHINE

(71) Applicant: Hamilton Sundstrand Corporation, Charlotte, NC (US)

(72) Inventors: Naison E. Mastrocola, Goshen, CT (US); Matthew Pess, West Hartford, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/969,061

(22) Filed: May 2, 2018

(65) Prior Publication Data

US 2019/0338706 A1 Nov. 7, 2019

(51) Int. Cl.
| | |
|---|---|
| *F02C 7/14* | (2006.01) |
| *F02C 7/18* | (2006.01) |
| *B64D 13/08* | (2006.01) |
| *B64D 37/34* | (2006.01) |
| *B64D 13/06* | (2006.01) |

(52) U.S. Cl.
CPC ............ *F02C 7/14* (2013.01); *B64D 13/08* (2013.01); *B64D 37/34* (2013.01); *F02C 7/18* (2013.01); *B64D 2013/064* (2013.01); *F05D 2260/213* (2013.01); *F05D 2260/98* (2013.01)

(58) Field of Classification Search
CPC ........ B64D 15/00; B64D 13/08; B64D 15/02; B64D 2013/0659; B64D 37/34; B64D 37/00; F02C 7/047
See application file for complete search history.

(56) References Cited

U.S. PATENT DOCUMENTS

| | | | |
|---|---|---|---|
| 6,939,392 B2 | 9/2005 | Huang et al. | |
| 7,334,422 B2* | 2/2008 | Zywiak | B64D 13/06 62/401 |
| 8,444,093 B1 | 5/2013 | Epstein | |
| 8,522,572 B2 | 9/2013 | Coffinberry et al. | |
| 2010/0071638 A1* | 3/2010 | Bulin | B64D 13/06 123/41.04 |
| 2013/0111938 A1* | 5/2013 | Mevenkamp | F28D 9/0062 62/129 |
| 2016/0332743 A1* | 11/2016 | Teicholz | B64D 27/10 |
| 2018/0038657 A1* | 2/2018 | Pal | B64D 47/00 |

FOREIGN PATENT DOCUMENTS

| | | |
|---|---|---|
| EP | 0436243 A2 | 6/1995 |
| EP | 2578845 A2 | 4/2013 |
| GB | 2340890 A | 3/2000 |

OTHER PUBLICATIONS

Search Report dated Aug. 14, 2019, 8 pages.

* cited by examiner

*Primary Examiner* — Tho V Duong
(74) *Attorney, Agent, or Firm* — Cantor Colburn LLP

(57) ABSTRACT

An integrated fuel and environmental control system is provided and includes a first heat exchanger in which fuel and oil thermally communicate and a second heat exchanger disposable in a super-cooled fluid flow. The second heat exchanger is receptive of at least one of the fuel and oil from the first heat exchanger whereby the at least one of the fuel and oil thermally communicate with the super-cooled fluid flow. The second heat exchanger is also receptive of a second fluid whereby the second fluid thermally communicates with the super-cooled fluid flow downstream from the thermal communication of the super-cooled fluid flow with the at least one of the fuel and oil.

20 Claims, 3 Drawing Sheets

SUPER-COOLED HEAT EXCHANGER OF AN AIR CYCLE MACHINE

BACKGROUND

The following description relates to air cycle machines and, more specifically, to a super-cooled heat exchanger of an air cycle machine with anti-icing capability.

Various systems of modern aircraft are becoming more integrated with each other. Often, major systems of such aircraft are becoming highly coupled in order to minimize weight, reduce envelope and maximize overall performance. For example, one such system integration that is now being considered is the integration of the aircraft environmental control system (ECS) and the turbine gas generation fuel system (FS).

BRIEF DESCRIPTION

According to an aspect of the disclosure, an integrated fuel and environmental control system is provided and includes a first heat exchanger in which fuel and oil thermally communicate and a second heat exchanger disposable in a super-cooled fluid flow. The second heat exchanger is receptive of at least one of the fuel and oil from the first heat exchanger whereby the at least one of the fuel and oil thermally communicate with the super-cooled fluid flow. The second heat exchanger is also receptive of a second fluid whereby the second fluid thermally communicates with the super-cooled fluid flow downstream from the thermal communication of the super-cooled fluid flow with the at least one of the fuel and oil.

In accordance with additional or alternative embodiments, the super-cooled fluid flow includes an airstream.

In accordance with additional or alternative embodiments, a mass flow rate of the super-cooled fluid flow substantially exceeds respective mass flow rates of the fuel, the oil and the second fluid.

In accordance with additional or alternative embodiments, at least one conduit is provided by which the at least one of the fuel and oil is transported from the first heat exchanger to the second heat exchanger.

In accordance with additional or alternative embodiments, a first control system controls relative amounts of the at least one of the fuel and oil received by the second heat exchanger.

In accordance with additional or alternative embodiments, the second fluid includes at least one of fuel and coolant.

In accordance with additional or alternative embodiments, the fuel and the second fluid are supplied from a fuel tank.

In accordance with additional or alternative embodiments, a second control system is configured to direct first and second portions of fuel, having thermally communicated with the super-cooled fluid, toward a heat load and the fuel tank, respectively, and to control relative amounts of the first and second portions of the fuel.

According to another aspect of the disclosure, an integrated fuel and environmental control system is provided and includes a first heat exchanger in which fuel and oil thermally communicate and a second heat exchanger. The second heat exchanger includes a leading edge disposable in a super-cooled fluid flow, a downstream portion and an upstream portion interposed between the leading edge and the downstream portion. The second heat exchanger is receptive of at least one of the fuel and oil from the first heat exchanger whereby the at least one of the fuel and oil thermally communicate with the super-cooled fluid flow in the upstream portion to prevent ice accumulation proximate to the leading edge. The second heat exchanger is also receptive of a second fluid whereby the second fluid thermally communicates with the super-cooled fluid flow in the downstream portion prior to the second fluid being output to a heat load.

In accordance with additional or alternative embodiments, the super-cooled fluid flow includes an airstream.

In accordance with additional or alternative embodiments, a mass flow rate of the super-cooled fluid flow substantially exceeds respective mass flow rates of the fuel, the oil and the second fluid.

In accordance with additional or alternative embodiments, at least one conduit is provided by which the at least one of the fuel and oil is transported from the first heat exchanger to the second heat exchanger.

In accordance with additional or alternative embodiments, a first control system controls relative amounts of the at least one of the fuel and oil received by the second heat exchanger.

In accordance with additional or alternative embodiments, the second fluid includes at least one of fuel and coolant.

In accordance with additional or alternative embodiments, the fuel and the second fluid are supplied from a fuel tank.

In accordance with additional or alternative embodiments, a second control system is configured to direct first and second portions of fuel, having thermally communicated with the super-cooled fluid in the upstream portion, toward a heat load and the fuel tank, respectively, and to control relative amounts of the first and second portions of the fuel.

According to yet another aspect of the disclosure, a method of operating an integrated fuel and environmental control system is provided and includes thermally communicating fuel and oil in a first heat exchanger, disposing a leading edge of a second heat exchanger in a super-cooled fluid flow, transporting at least one of the fuel and oil from the first heat exchanger to the second heat exchanger whereby the at least one of the fuel and oil thermally communicates with the super-cooled fluid flow in an upstream portion of the second heat exchanger to prevent ice accumulation proximate to the leading edge and transporting a second fluid to the second heat exchanger whereby the second fluid thermally communicates with the super-cooled fluid flow in a downstream portion of the second heat exchanger prior to the second fluid being output to a heat load.

In accordance with additional or alternative embodiments, the super-cooled fluid flow includes an airstream having a mass flow rate substantially exceeding respective mass flow rates of the fuel, the oil and the second fluid.

In accordance with additional or alternative embodiments, the method further includes controlling relative amounts of the at least one of the fuel and oil transported to the second heat exchanger.

In accordance with additional or alternative embodiments, the method further includes supplying the fuel and the second fluid from a fuel tank, directing first and second portions of fuel, having thermally communicated with the super-cooled fluid flow in the upstream portion, toward the heat load and the fuel tank, respectively and controlling relative amounts of the first and second portions of the fuel.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

Figure 1:
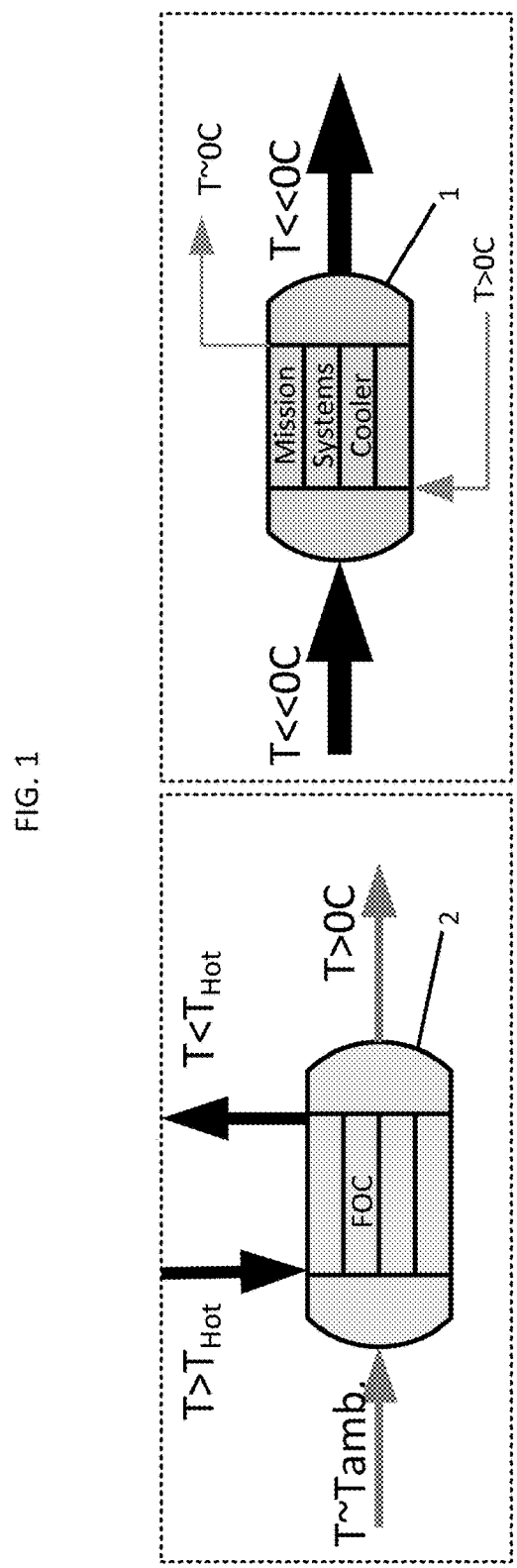
FIG. 1 is a schematic illustration of separate fuel and environmental systems of an aircraft.

With reference to FIG. 1, a heat exchanger (HEX) for an environmental control system (ECS), such as an air cooler 1, is provided in a flow path of a super-cooled fluid. The air cooler 1 is receptive of coolant above freezing (0° C.) to prevent ice accumulation due to the super-cooled fluid. The coolant is thus cooled within the air cooler 1 by the super-cooled fluid to about 0° C. However, since the mass flow rate of the super-cooled fluid greatly exceeds that of the coolant, a risk of ice accumulation still occurring exists unless the amount of coolant can be drastically increased or heated. Meanwhile, the fuel system (FS) sinks thermal energy into fuel in a fuel oil cooler 2 which has limited capacity due to safety and reliability concerns.

Thus, as will be described below, a system is provided by which additional capacity could be utilized within the fuel of an FS that is integrated with an ECS, where the fuel is energy neutral or representative of a net gain at an aircraft level, to realize performance improvements. For example, the system provides for heating of a leading edge of a heat exchanger so that fluids within the heat exchanger can be decreased to sub-freezing temperatures without risk of ice accumulation and so that fuel temperatures can be lowered as well.

Figure 2:
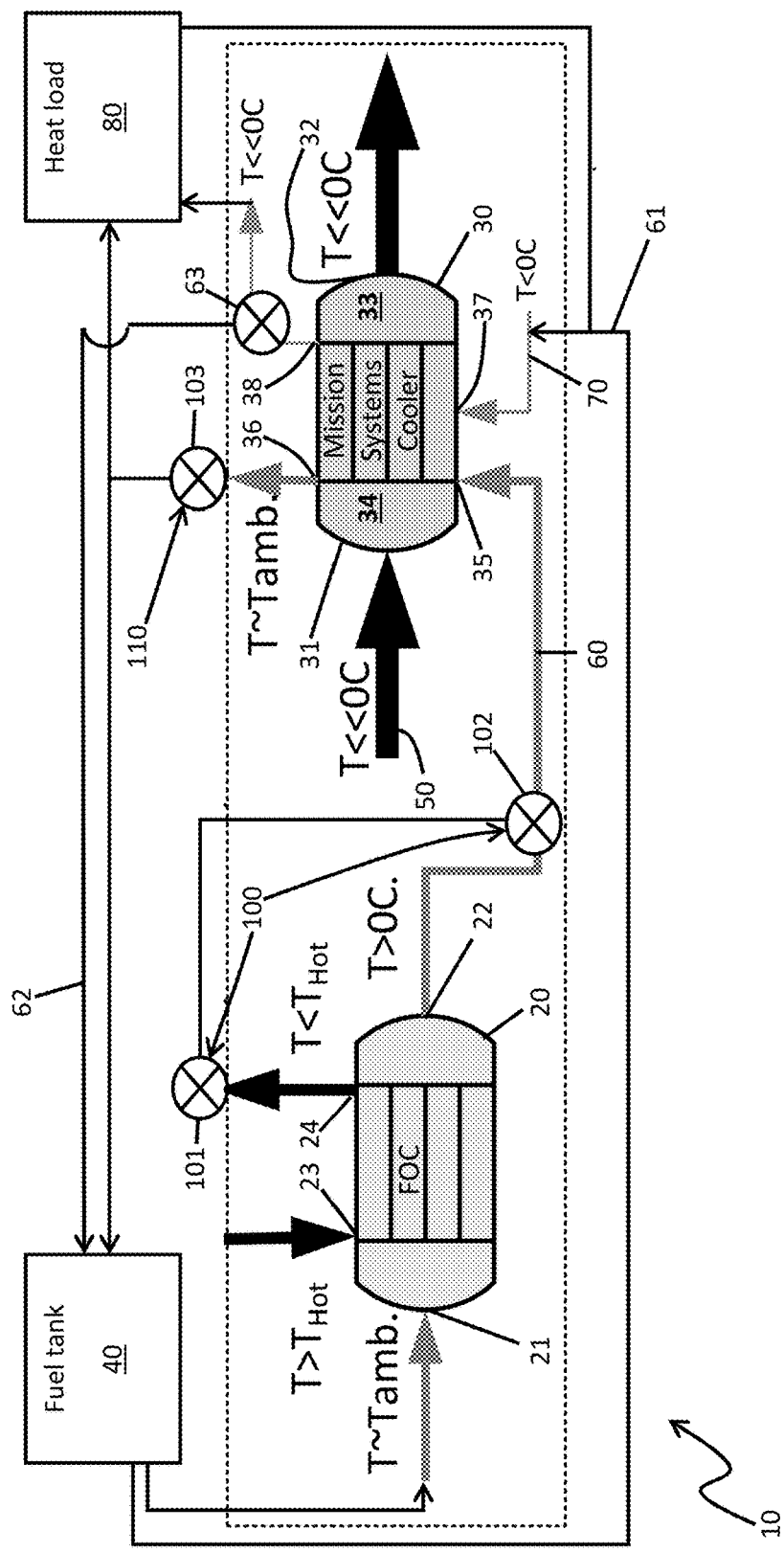
FIG. 2 is a schematic illustration of an integrated fuel and environmental system in accordance with embodiments.

With reference to FIG. 2, an integrated fuel and environmental control system (hereinafter referred to as an "integrated system") 10 is provided. The integrated system 10 includes a first heat exchanger or a fuel oil cooler (hereinafter referred to as a "fuel oil cooler") 20, a second heat exchanger or an air cooler (hereinafter referred to as an "air cooler") 30 and a fuel tank 40.

The fuel oil cooler 20 is a heat exchanger and includes a first inlet 21, a first outlet 22, a second inlet 23 and a second outlet 24. Fuel supplied from the fuel tank 40 enters the fuel oil cooler 20 at about an ambient temperature $T_{amb}$ of the fuel tank 40 via the first inlet 21. Oil enters the fuel oil cooler 20 at a relatively high temperature $T_{Hot}$ via the second inlet 23. Within the fuel oil cooler 20, heat is transferred from the oil to the fuel. The fuel then exits the fuel oil cooler 20 via the first outlet 22 at a temperature which exceeds $T_{amb}$ (e.g., ~0° C. or >0° C.) and the oil exits the fuel oil cooler 20 via the second outlet 24 at a relatively low temperature, which is otherwise above the temperature of the exiting fuel.

The air cooler 30 includes a leading edge 31, which is disposable in the pathway of relatively cold air or super-cooled fluid flow 50, a trailing edge 32 from which the super-cooled fluid flow 50 proceeds along its original path, a downstream section 33 proximate to the trailing edge 32 and an upstream section 34 interposed between the leading edge 31 and the downstream section 33. The super-cooled fluid flow 50 may, in some cases, be an airstream at an exterior of an aircraft in mid-flight and thus may be substantially below freezing (e.g., $T<<0°$ C.) and may have a relatively high mass flow rate that substantially exceeds that of the fuel, the oil or any other fluids associated with the integrated system 10.

The air cooler 30 further includes a third inlet 35, a third outlet 36, a fourth inlet 37 and a fourth outlet 38. The third inlet 35 and the third outlet 36 may be disposed within the upstream section 34 and may be proximate to the leading edge 31. The fourth inlet 37 may be substantially centrally located between the leading edge 31 and the upstream section 34 and the trailing edge 32 and the downstream section 33. The fourth outlet 38 may be disposed within the downstream section 33 and may be proximate to the trailing edge 32.

At least one of the fuel and the oil exiting the fuel oil cooler 20 is transported to the air cooler 30 along conduit 60, which fluidly couples and partially integrates the fuel oil cooler 20 with the air cooler 30, and enters the air cooler 30 via the third inlet 35. The at least one of the fuel and the oil eventually exits the air cooler 30 via the third outlet 36. In the case of the fuel being used, the fuel, which exceeds 0° C., thermally interacts with the super-cooled fluid flow 50 in the upstream section 34 and serves to prevent ice accumulation on the leading edge 31 due to the impingement of the super-cooled fluid flow 50 on the leading edge 31. In the case of the oil being used, the oil, which is at a relatively low temperature but which still exceeds 0° C., similarly thermally interacts with the super-cooled fluid flow 50 in the upstream section 34 and serves to prevent ice accumulation on the leading edge 31 due to the impingement of the super-cooled fluid flow 50 on the leading edge 31.

Since the mass flow rate of the super-cooled fluid flow 50 substantially exceeds either the fuel or the oil, the super-cooled fluid flow 50 proceeds through the upstream section 34 without substantially decreasing in temperature and this remains super-cooled. The fuel or the oil is cooled, however, with for example the fuel exiting the air cooler 30 via the third outlet 36 at about $T_{amb}$.

The air cooler 30 is also receptive of a second fluid 70, which enters the air cooler 30 via the fourth inlet 37 and eventually exits the air cooler 30 via the fourth outlet 38. The second fluid 70 may include fuel drawn from the fuel tank 40 through a second conduit 61 or coolant. In either case, the mass flow rate of the super-cooled fluid flow 50 substantially exceeds that of the second fluid 70 and the second fuel may enter the air cooler 30 at a low temperature (e.g., $T<0°$ C. or higher). Thus, within the air cooler 30, heat is transferred from the second fluid 70 to the super-cooled fluid flow 50 in the downstream section 33 such that the super-cooled fluid flow 50 exits the air cooler 30 still super-cooled and the second fluid 70 exits the air cooler 30 at a lower temperature than it had upon entering (e.g., $T<<0°$ C.).

Where the second fluid 70 includes coolant, the second fluid 70 may be used to cool a heat load 80, such as various electrical or environmental systems of an aircraft, upon exiting the air cooler 30. Where the second fluid 70 includes fuel, the second fluid 70 may be used to cool the heat load 80 or to lower overall temperature of the fuel tank 40 upon exiting the air cooler 30.

In accordance with embodiments, the integrated system 10 may further include a first control system 100. The first control system 100 is configured to control relative amounts of the at least one of the fuel and oil received by the air cooler 30. As shown in FIG. 2, the first control system 100 may include a first valve 101, which is disposed and configured to control an amount of the oil that is diverted to the conduit 60, and a second valve 102. The second valve 102 may be provided as a three-way valve and is disposed and configured to control how much of each of the fuel and the oil is permitted to flow to the air cooler 30.

The first control system 100 may further include a control element that is operably coupled to each of the first and second valves 101 and 102 and that is configured to control various operations of each of the first and second valves 101 and 102. The control element may include a processing unit, a memory unit and a networking unit by which the processing unit is disposed in signal communication with the first and second valves 101 and 102 as well as with multiple sensors throughout the integrated system 10. The memory unit has executable instructions stored thereon, which are readable and executable by the processing unit. When they are read and executed by the processing unit, the executable instructions cause the processing unit to determine at least temperatures and mass flow rates of the fuel and oil exiting the fuel oil cooler 20 and target temperatures and mass flow rates thereof for further usage and to calculate or judge in accordance with the determinations relative quantities of the fuel and the oil that should be transported to and through the air cooler 30 for anti-icing effects and cooling by the super-cooled fluid flow 50.

In accordance with further embodiments, the integrated system 10 may further include a second control system 110. The second control system 110 is configured to direct first and second portions of fuel, having thermally communicated with the super-cooled fluid flow 50 in the upstream portion 34, toward the heat load 80 and the fuel tank 40, respectively, and to control relative amounts of the first and second portions of the fuel. As shown in FIG. 2, the second control system 110 may include a third valve 103, which is disposed and configured to control the relative amounts of the first and second portions of the fuel.

The second control system 110 may further include a control element that is operably coupled to the third valve 103 and that is configured to control various operations of the third valve 103. The control element may include a processing unit, a memory unit and a networking unit by which the processing unit is disposed in signal communication with the third valve 103 as well as with the multiple sensors throughout the integrated system 10. The memory unit has executable instructions stored thereon, which are readable and executable by the processing unit. When they are read and executed by the processing unit, the executable instructions cause the processing unit to determine at least a temperature and a mass flow rate of the fuel exiting the air cooler 30 and a target temperature and mass flow rate thereof for further usage and to calculate or judge in accordance with the determinations the relative quantities of the first and second portions of the fuel.

Where the second fluid 70 includes fuel from the fuel tank 40, the integrated system 10 may include the second conduit 61 that fluidly couples the fuel tank 40 to the air cooler 30, a return fuel tank conduit 62 that fluidly couples the air cooler 30 to the fuel tank 40 and one or more valves 63 that are controllable in a similar manner as the first and second valves 101 and 102 and/or the third valve 103.

Figure 3:
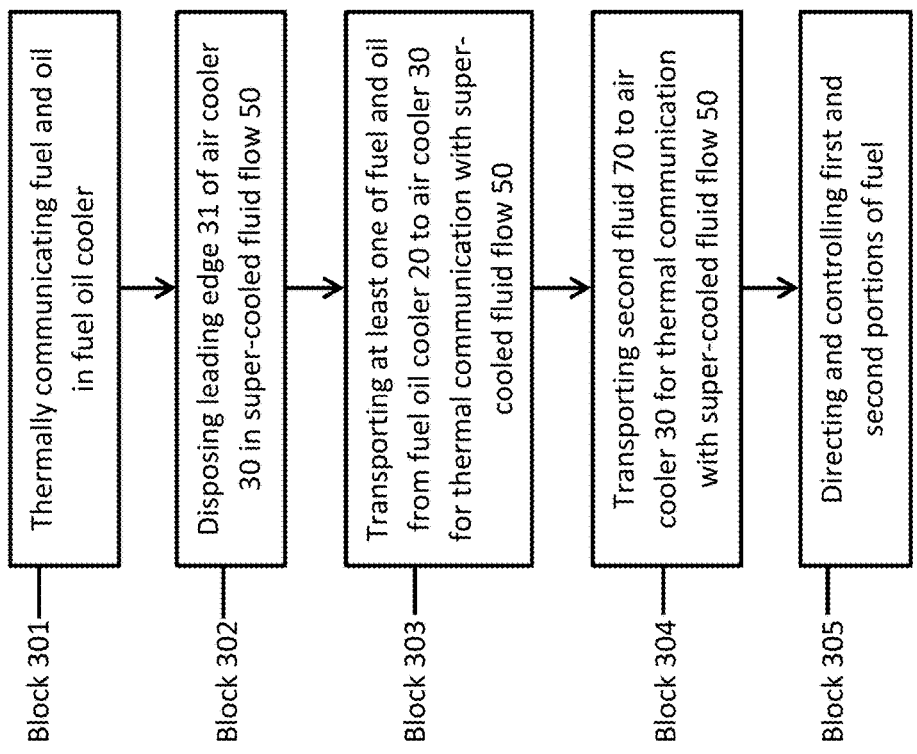
FIG. 3 is a flow diagram illustrating a method of operating an integrated fuel and environmental control system in accordance with embodiments.

With reference to FIG. 3, a method of operating the integrated system 10 described herein is provided. As shown in FIG. 3, the method includes thermally communicating fuel (supplied from fuel tank 40) and oil in the fuel oil cooler 20 (block 301) and disposing the leading edge 31 of the air cooler 30 in a super-cooled fluid flow 50 (block 302). The method further includes transporting at least one of the fuel and oil from the fuel oil cooler 20 to the air cooler 30 whereby the at least one of the fuel and oil thermally communicates with the super-cooled fluid flow 50 in the upstream portion 34 of the air cooler 30 to prevent ice accumulation proximate to the leading edge 31 (block 303). In addition, the method includes transporting the second fluid 70 (supplied as fuel from the fuel tank 40 or coolant) to the air cooler 30 whereby the second fluid 70 thermally communicates with the super-cooled fluid flow 50 in the downstream portion 33 of the air cooler 30 prior to the second fluid 70 being output to the heat load 80 (block 304).

In accordance with embodiments, the super-cooled fluid flow 50 includes an airstream having a mass flow rate that substantially exceeds respective mass flow rates of the fuel, the oil and the second fluid 70. In addition, the transporting of block 303 may include controlling relative amounts of the at least one of the fuel and oil transported to the air cooler 30. In accordance with further embodiments, the method may also include directing first and second portions of the fuel, having thermally communicated with the super-cooled fluid flow 50 in the upstream portion 34, toward the heat load 80 and the fuel tank 40, respectively, and controlling relative amounts of the first and second portions of the fuel (block 305).

Benefits of the features described herein are the provision of an integrated system in which a fuel oil cooler of an aircraft or other suitable vehicle is integrated with an air cooler of the aircraft/vehicle. The integrated system provides for increased anti-icing capacity through the use of heated fuel or oil as well as greater cooling capacity for a downstream heat load by coolant that is not solely responsible for the anti-icing.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. An integrated fuel and environmental control system, comprising:
   a first heat exchanger in which fuel and oil thermally communicate; and
   a second heat exchanger disposable in a super-cooled fluid flow,
   the second heat exchanger being receptive of:
   the oil and a quantity of the fuel from the first heat exchanger whereby the oil and the quantity of the fuel thermally communicate with the super-cooled fluid flow, and
   a second fluid whereby the second fluid thermally communicates with the super-cooled fluid flow downstream from the thermal communication of the super-cooled fluid flow with the oil and the quantity of the fuel.

2. The integrated fuel and environmental control system according to claim 1, wherein the super-cooled fluid flow comprises an airstream.

3. The integrated fuel and environmental control system according to claim 1, wherein a mass flow rate of the super-cooled fluid flow substantially exceeds respective mass flow rates of the oil, the quantity of the fuel and the second fluid.

4. The integrated fuel and environmental control system according to claim 1, further comprising:
    at least one conduit by which the oil and the quantity of the fuel is transported from the first heat exchanger to the second heat exchanger; and
    a valve disposed and configured to control how much of the oil and the quantity of the fuel are permitted to flow to the second heat exchanger.

5. The integrated fuel and environmental control system according to claim 1, further comprising a first control system to control relative amounts of the oil and the quantity of the fuel received by the second heat exchanger.

6. The integrated fuel and environmental control system according to claim 1, further comprising a fuel tank wherein the second fluid comprises fuel drawn from the fuel tank which is not flown through the first heat exchanger.

7. The integrated fuel and environmental control system according to claim 1, wherein the fuel and the second fluid are supplied from a fuel tank.

8. The integrated fuel and environmental control system according to claim 7, further comprising a second control system configured to:
    direct first and second portions of fuel, having thermally communicated with the super-cooled fluid, toward a heat load and the fuel tank, respectively; and
    control relative amounts of the first and second portions of the fuel.

9. An integrated fuel and environmental control system, comprising:
    a first heat exchanger in which fuel and oil thermally communicate; and
    a second heat exchanger comprising a leading edge disposable in a super-cooled fluid flow, a downstream portion and an upstream portion interposed between the leading edge and the downstream portion,
    the second heat exchanger being receptive of:
        the oil and a quantity of the fuel from the first heat exchanger whereby the oil and the quantity of the fuel thermally communicate with the super-cooled fluid flow in the upstream portion to prevent ice accumulation proximate to the leading edge, and
        a second fluid whereby the second fluid thermally communicates with the super-cooled fluid flow in the downstream portion prior to the second fluid being output to a heat load.

10. The integrated fuel and environmental control system according to claim 9, wherein the super-cooled fluid flow comprises an airstream and the leading edge is convex in the airstream.

11. The integrated fuel and environmental control system according to claim 9, wherein a mass flow rate of the super-cooled fluid flow substantially exceeds respective mass flow rates of the oil, the quantity of the fuel and the second fluid.

12. The integrated fuel and environmental control system according to claim 9, further comprising:
    at least one conduit by which the oil and the quantity of the fuel is transported from the first heat exchanger to the second heat exchanger; and
    a valve disposed and configured to control how much of the oil and the quantity of the fuel are permitted to flow to the second heat exchanger.

13. The integrated fuel and environmental control system according to claim 9, further comprising a first control system to control relative amounts of the oil and the quantity of the fuel received by the second heat exchanger.

14. The integrated fuel and environmental control system according to claim 9, further comprising a fuel tank wherein the second fluid comprises fuel which is drawn from the fuel tank which is not flown through the first heat exchanger.

15. The integrated fuel and environmental control system according to claim 9, wherein the fuel and the second fluid are supplied from a fuel tank.

16. The integrated fuel and environmental control system according to claim 15, further comprising a second control system configured to:
    direct first and second portions of fuel, having thermally communicated with the super-cooled fluid in the upstream portion, toward a heat load and the fuel tank, respectively; and
    control relative amounts of the first and second portions of the fuel.

17. A method of operating an integrated fuel and environmental control system, the method comprising:
    thermally communicating fuel and oil in a first heat exchanger;
    disposing a leading edge of a second heat exchanger in a super-cooled fluid flow;
    transporting the oil and a quantity of the fuel from the first heat exchanger to the second heat exchanger whereby the oil and the quantity of the fuel thermally communicates with the super-cooled fluid flow in an upstream portion of the second heat exchanger to prevent ice accumulation proximate to the leading edge; and
    transporting a second fluid to the second heat exchanger whereby the second fluid thermally communicates with the super-cooled fluid flow in a downstream portion of the second heat exchanger prior to the second fluid being output to a heat load.

18. The method according to claim 17, wherein the super-cooled fluid flow comprises an airstream having a mass flow rate substantially exceeding respective mass flow rates of the oil, the quantity of the fuel and the second fluid.

19. The method according to claim 17, further comprising controlling relative amounts of the oil and the quantity of the fuel transported to the second heat exchanger.

20. The method according to claim 17, further comprising:
    supplying the fuel and the second fluid from a fuel tank;
    directing first and second portions of fuel, having thermally communicated with the super-cooled fluid flow in the upstream portion, toward the heat load and the fuel tank, respectively; and
    controlling relative amounts of the first and second portions of the fuel.

* * * * *